US005678599A

United States Patent [19]

Moss

[11] Patent Number: 5,678,599

[45] Date of Patent: Oct. 21, 1997

[54] HOSE REEL RETRACTABLE INTO A STORAGE RECEPTACLE

[75] Inventor: Timothy D. Moss, Tierra Verde, Fla.

[73] Assignee: Moss Constructors, Clearwater, Fla.

[21] Appl. No.: 652,106

[22] Filed: May 23, 1996

[51] Int. Cl.$^6$ .................... F16K 27/08

[52] U.S. Cl. .................... 137/377; 137/355.16; 137/355.26

[58] Field of Search .................... 137/355.16, 355.26, 137/377

[56] References Cited

U.S. PATENT DOCUMENTS

| | | | |
|---|---|---|---|
| 1,726,084 | 8/1929 | Montgomery . | |
| 2,071,731 | 2/1937 | Craig et al. | 137/355.26 |
| 2,135,736 | 11/1938 | Stewart . | |
| 2,174,099 | 3/1939 | Vogler et al. . | |
| 2,964,258 | 12/1960 | Kutil . | |
| 2,973,906 | 3/1961 | Murray et al. . | |
| 3,183,927 | 5/1965 | Weese et al. | 137/355.26 |
| 3,450,150 | 6/1969 | Miller . | |
| 3,516,433 | 6/1970 | Guinot | 137/355.26 |
| 3,776,262 | 12/1973 | Fritsch . | |
| 4,062,493 | 12/1977 | Suggs . | |

FOREIGN PATENT DOCUMENTS

| | | | |
|---|---|---|---|
| 313334 | 6/1929 | United Kingdom | 137/355.26 |

*Primary Examiner*—A. Michael Chambers
*Attorney, Agent, or Firm*—Kremblas, Foster, Millard & Pollick; Sidney W. Millard

[57] ABSTRACT

A box-like enclosure is recessed below ground surface with a pivotal lid secured to one sidewall of the enclosure. A plurality of sidewalls form the box which is open at its bottom to allow water drainage. Mounted within the box on an interior surface of one of the sidewalls are a pair of lever arms which support a reel and a hose mounted thereon. The box encloses the hose and reel when the lid is closed for aesthetic purposes and to prevent obstructions to pedestrian traffic and the like. The lid is raised by a lever projecting outwardly of the box sidewall on which the top is pivoted. This allows a user to step on the lever and raise the lid, which in turn allows the hose and reel to pivot upward on the mounting arms into useful orientation.

20 Claims, 2 Drawing Sheets

HOSE REEL RETRACTABLE INTO A STORAGE RECEPTACLE

FIELD OF THE INVENTION

This invention relates to a recessed hose and reel mounting system to be located below ground level where the hose and reel may be pivoted upward to operative position when the lid is opened.

BACKGROUND OF THE INVENTION

Flexible water hoses mounted on reels adjacent a water spigot are conventional pieces of apparatus found on the lawns of dwellings, in garages, adjacent piers for washing down boats and the like, and in numerous other locations. The fact that the hose is on a reel and connected to a spigot is convenient for storing the hose above the surrounding surface. It is desirable that the hose be located off the supporting surface to prevent pedestrian traffic from tripping or vehicle traffic from depressing and crushing the sidewalls of the hose.

Unfortunately, the hose and reel in combination take up space and create a somewhat unsightly appearance detracting from the aesthetic appearance in the vicinity. It is of most importance to note that the hose and reel combination take up space, particularly in a work environment such as a garage or a dock for boats.

Structure for enclosing a hose and reel is not new per se, but the structure and purposes of known apparatus for recessing the combination below ground level is cumbersome and intended for entirely different purposes than the invention disclosed herein.

An example of a hose and reel combination which is recessed below a wall or substrate is disclosed in the patent to Weese et al., U.S. Pat. No. 3,183,927. Weese et al. disclose a box containing a hose reel and designed to be mounted with its upwardly facing door panel substantially even with an adjacent surface. The enclosed hose and reel are intended to be enclosed within the box by pivotally mounting the reel to swing upwardly to an operating position when the door has been opened, where the pivoting axis of the reel mounting system is parallel with the axis of the reel.

The patent to Kutil, U.S. Pat. No. 2,964,258, discloses a pivotally mounted hose and reel combination.

The patents to Stewart, U.S. Pat. No. 2,135,736; Vogler et al., U.S. Pat. No. 2,174,099; and Murray et al., U.S. Pat. No. 2,973,906, disclose structures for interior mounting of garden hoses.

The patents to Miller, U.S. Pat. No. 3,450,150; Montgomery, U.S. Pat. No. 1,726,083; Fritsch, U.S. Pat. No. 3,776,262; and Suggs, U.S. Pat. No. 4,062,493, all disclose some additional hose and reel mounting systems.

What is needed in the industry is a more universally useful enclosure which may be mounted in various locations with minimum of surrounding structure to make for easy installation of a recessed mounting system for a hose and reel combination. That is, the recessed enclosure can house the hose and reel combination for easy access when needed without taking up space in the work environment.

SUMMARY OF THE INVENTION

This invention accomplishes the desired result by providing a corrosion resistant box intended to be recessed below pedestrian traffic surfaces which allows a covering lid to be closed and be at approximately at the level of the surrounding substrate surface.

The box or housing is comprised of sidewalls defining an enclosure. A reel is mounted to be stored within the enclosure when the hose wound on the reel is not in operative orientation.

The reel is supported on a pair of pivotal arms secured to a pair of lugs projecting inwardly from one sidewall of the enclosure. The lugs are located on one of the sidewalls which does not support the hinged connection between the top of the enclosure and the sidewall.

It is intended that the top or lid be pivotally mounted by a hinge structure to one of the sidewalls to pivot between open and closed position. In closed position the lid covers the enclosure and is strong enough to support pedestrian and light vehicle traffic thereon. When the lid is opened the hose and reel combination may be pivoted upwardly on the arms such that the upper level of the reel is above the closed elevation of the lid. This allows a user of the structure to grasp the hose end and pull it to a location where it is desired to dispense water. This could be a flower bed, a boat dock, a lawn sprinkler, or anything else one could conceive. The reason the pivoting arms supporting the reel are mounted on a sidewall different from the lid is that the lid is an obstruction to easy unreeling of the hose or its subsequent retraction. Orienting the rotating axis of the reel parallel with one of the sidewalls, which is not the sidewall supporting the hinge connected to the lid, insures that the hose does not scrape across the top of the open lid under most conditions.

The structure disclosed for the enclosure forming the sidewalls of the box might be of any polygonal shape without departing from the inventive concept. However, in the preferred embodiment, the box is of a generally rectangular structure.

A water supply line from any conventional water source is directed to the housing where it is connected to one end of the hose. The hose is mounted on a reel in the housing. A cut-off valve is mounted within the structure intermediate the sidewalls of the housing and the connection of the water source to the hose end. This allows the pressurized water of the supply system to be closed off during times of non-use. Additionally, a pressure relief valve of conventional design and operation is mounted intermediate the cut-off valve and the hose end to relieve pressure in the hose after the cut-off valve is closed when water is not being discharged through the hose.

A lever projecting transversely of the lid at the sidewall where the lid is pivotally mounted allows a user to step on the lever to pivot the lid to an open position. Thereafter, compression springs extending between a different sidewall and two lever support arms mounting the reel are allowed to bias the reel to an upward operative position with the upper portion of the reel pushed above the level of the closed lid.

The hose may be retracted and wound on the reel by a manually operated handle, a spring actuated device or some mechanical-electrical device.

Objects of the invention not understood from the above will be clearly understood upon a review of the drawings and the description of the preferred embodiment which follows.

DESCRIPTION OF THE PREFERRED EMBODIMENT

Figure 5:
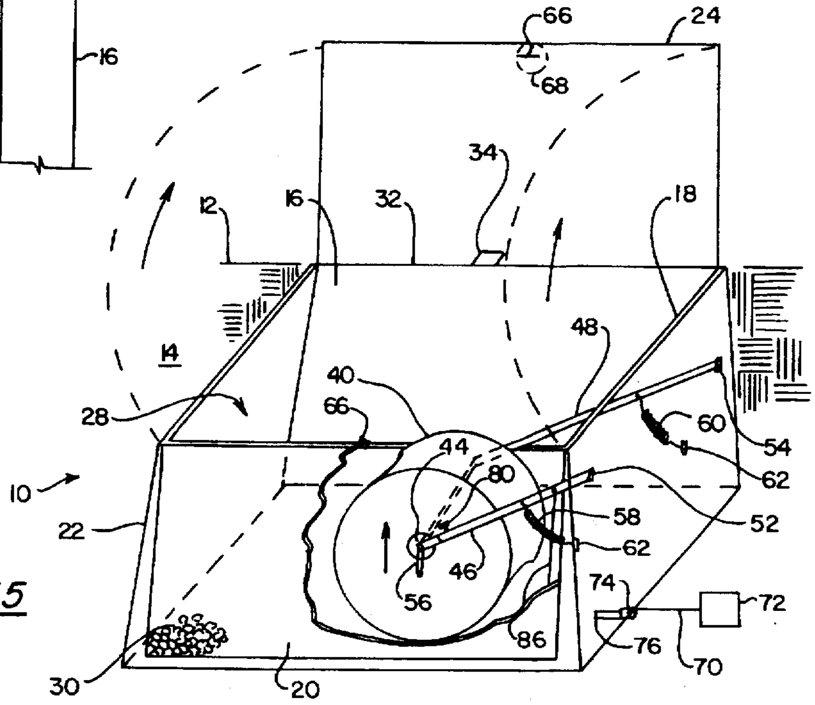
FIG. 5 is a schematic, perspective view of the combination, partially in section.

Looking particularly to FIG. 5, a rectangular box or housing 10 is recessed below the surface 12 of soil, concrete, or wood flooring 14. The surrounding structure or substrate 14 could be the soil of a lawn, the concrete floor of a commercial building or the wood flooring of a lake or ocean dock.

The box 10 is formed of a plurality of sidewalls 16, 18, 20, 22 which together form an enclosure 28 which may be covered by a top or lid 24. The bottom 26 is intended to be open to allow the drainage of water from the enclosure 28. To facilitate drainage where the box is installed in soil, a layer of two inches or so of crushed rock 30 is supplied.

Figure 2:
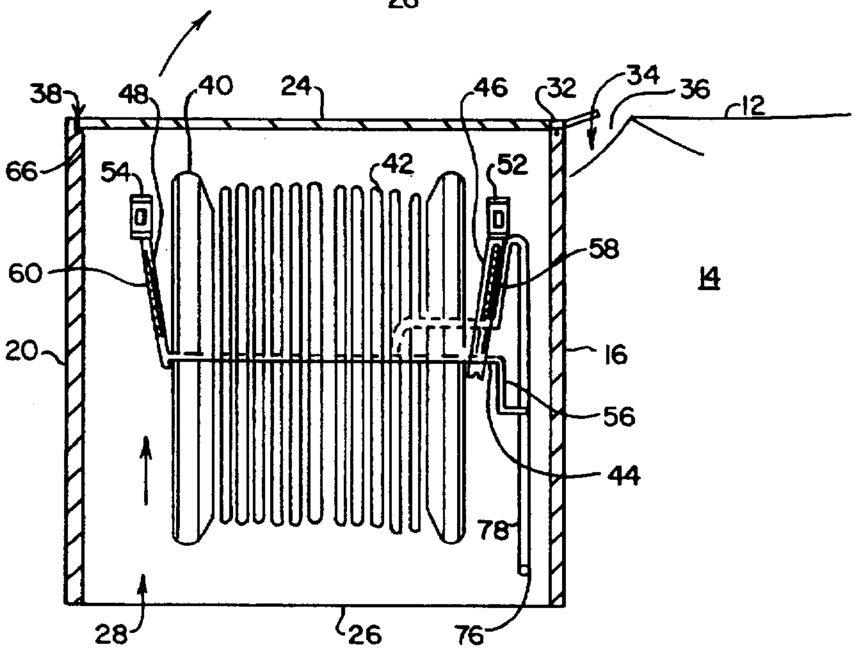
FIG. 2 is a sectional view taken along line 2—2 of FIG. 1.

Lid 24 is pivotally mounted by a hinge 32 at the top of sidewall 16 and may be opened by foot pressure applied to a lever 34 projecting transversely of sidewall 16 and to the outside of the enclosure 28. Note FIG. 2 which shows a recessed area or cavity 36 to accommodate the pivoting lever 34 when the lid 24 rises. In the environment where the housing 10 is recessed into soil, the hole 36 is simply excavated to serve the intended purpose. It will be observed that the lever 34 is indicated as being angled slightly upward from the flat upper surface of lid 24, but that is not a requirement. Under certain circumstances the lever 34 should extend parallel with the upper surface of lid 24 so as not to be an obstruction which might cause pedestrians to trip.

FIGS. 1, 2, 3, and 4 illustrate the top 24 as being housed in a cut out 38 recessed into the upper surface of the sidewalls. Indeed, that is the preferred embodiment. However, it may also be that the hinge 32 is secured to the outer surface of sidewall 16 and the top 24 rests on the upper edge of the sidewalls when it is in closed position.

Because of the environment in which the box 10 is designed to operate, preferably it will be comprised of fiberglass reinforced resin, such that it will not rust or be susceptible to corrosion from spray of salt water. Note also that the sidewalls taper in a downward direction to a larger cross-sectional area to provide structural stability as it may have increased side pressure at lower elevations.

A corrosion resistant reel 40 supports a hose 42 on an axle 44 having an axis generally parallel with sidewall 18.

Reel 40 is pivotal from a lower position where it is completely within the enclosure 28 and an upper position where the upper edge of the reel projects above the upper edges of the sidewalls and above the closed surface of top 24. In its upper location, the reel is high enough that the hose 42 may be withdrawn horizontally or otherwise to a location where water is desired to be dispensed. Note that axle 44 is mounted on a pair of pivotal support arms 46, 48 which are connected by pivot pins 50 which project through lugs 52, 54. Lugs 52, 54 are shown integral with sidewall 18.

It will be observed that the reel is located on one of the other sidewalls than the sidewall 16 supporting hinge 32 connecting the lid 24 to sidewall 16. The reason for such location of the reel support is that it is not desirable to have the hose surface be dragged across the upper edge of open lid 24 when the hose is being extended or retracted. A handle 56 is illustrated as projecting from the axle 44 of the reel 40 for purposes of retracting the hose, but it will be clear that mechanical-electrical means could be employed as desired.

A pair of compression springs 58, 60 are mounted within the enclosure 28 to provide an upward bias on the support arms 46, 48. One end of each compression spring is connected to a lever arm and the other end of the compression spring is connected at sidewall 16 indicated generally at 62 as best seen in FIG. 3.

Figure 3:
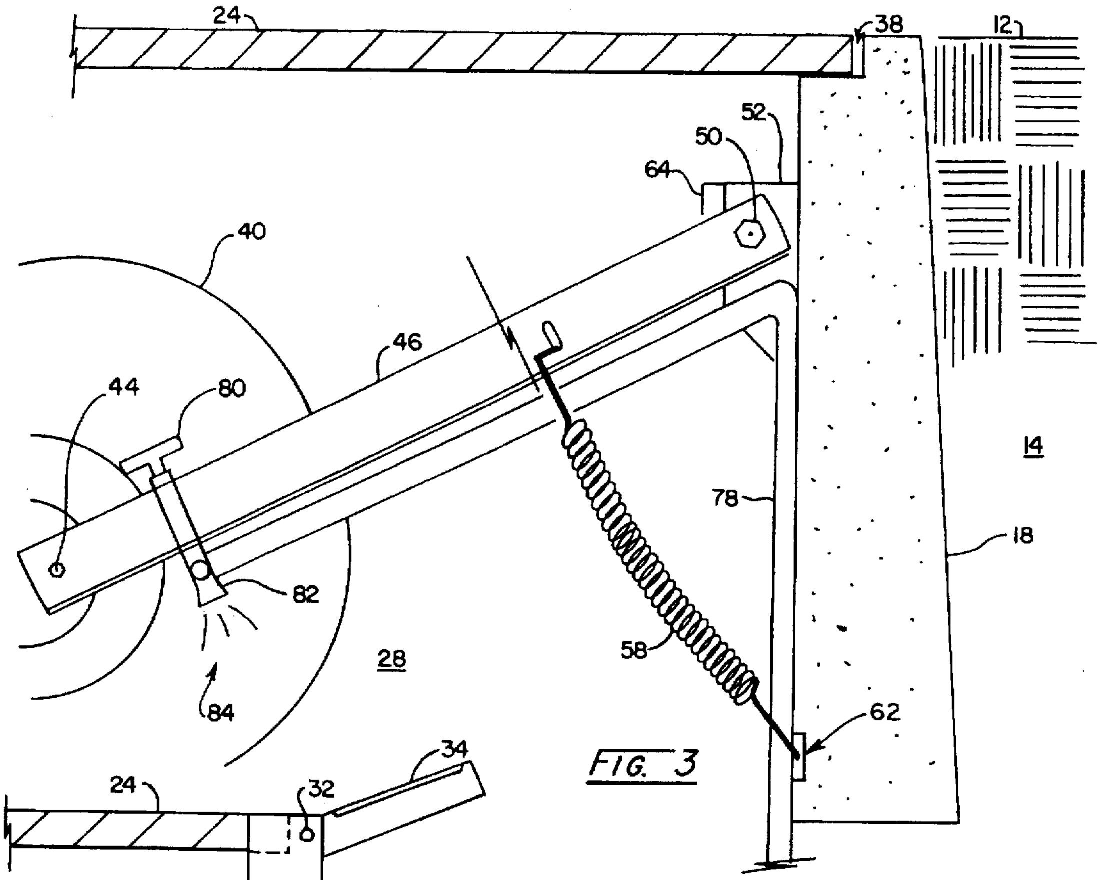
FIG. 3 is an enlarged fragmentary sectional view of the compression springs mounted on one sidewall and an associated support arm.
Figure 4:
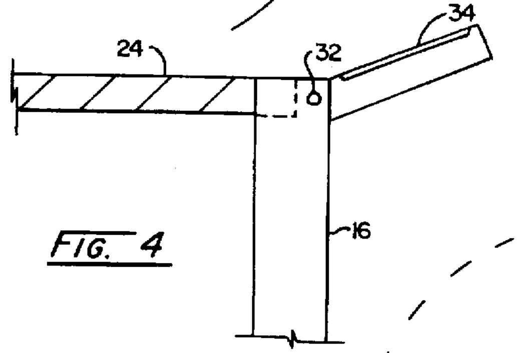
FIG. 4 is a fragmentary sectional view showing a lever projecting transversely of one sidewall and connected to the lid.

Looking particularly to FIG. 3, a latch 64 is supported either on lug 52 or on support arm 46 to hold the support arm in its lower position when the watering system is not in operation. It is a latch 64 which is operable to hold the support arm in position, but then to release it upon the downward push by hand or foot after lid 24 is raised out of its closed position. The latch 64 prevents the reel 40 from springing upward upon the opening of the lid before the operator is ready for it to rise.

An optional lock 66 (see FIGS. 2 and 5) is shown mounted partially on the edge of the lid most remote from hinge 32 and partially on the inside of sidewall 20. If it is desired to maintain such a lock, a ring 68 may be recessed within the upper surface of top 24 to disengage latch 66 or merely to provide an alternative for lifting the lid instead of lever 34.

To supply water to hose 42, a water feed line 70 leads from a water source 72 to a stub 74 which projects through an aperture 76 in sidewall 18. Stub 74 is connected to flexible lead line 78 which is ultimately connected to the inner end of hose 42. The exact structural features for the connection and the reel structure itself are conventional and need not be described herein.

When the hose and reel combination is in retracted position, within the enclosure 28, it is desirable to close the feed valve 80 to the hose, such that, when leaks occur in the hose 42 or the nozzle at the remote end of the hose continual water flow is avoided. This invention discloses two separate shut-off valves. The first is best illustrated in FIG. 3, which shows shut-off valve 80 supported on arm 46. Where this structure is desirable, a pressure relief valve 82, see FIG. 3, is secured in the feed line 78 to the hose 42 intermediate valve 80 and the connection to the innermost end of the hose 42. Such pressure relief valves are well known in the industry and their structure and mode of operation need not be described. What they do is recognize when the shut-off valve 80 is closed and then after a period of time it discharges water at 84, such that the hose 42 is not maintained in a pressurized condition when the apparatus is not being used.

Figure 1:
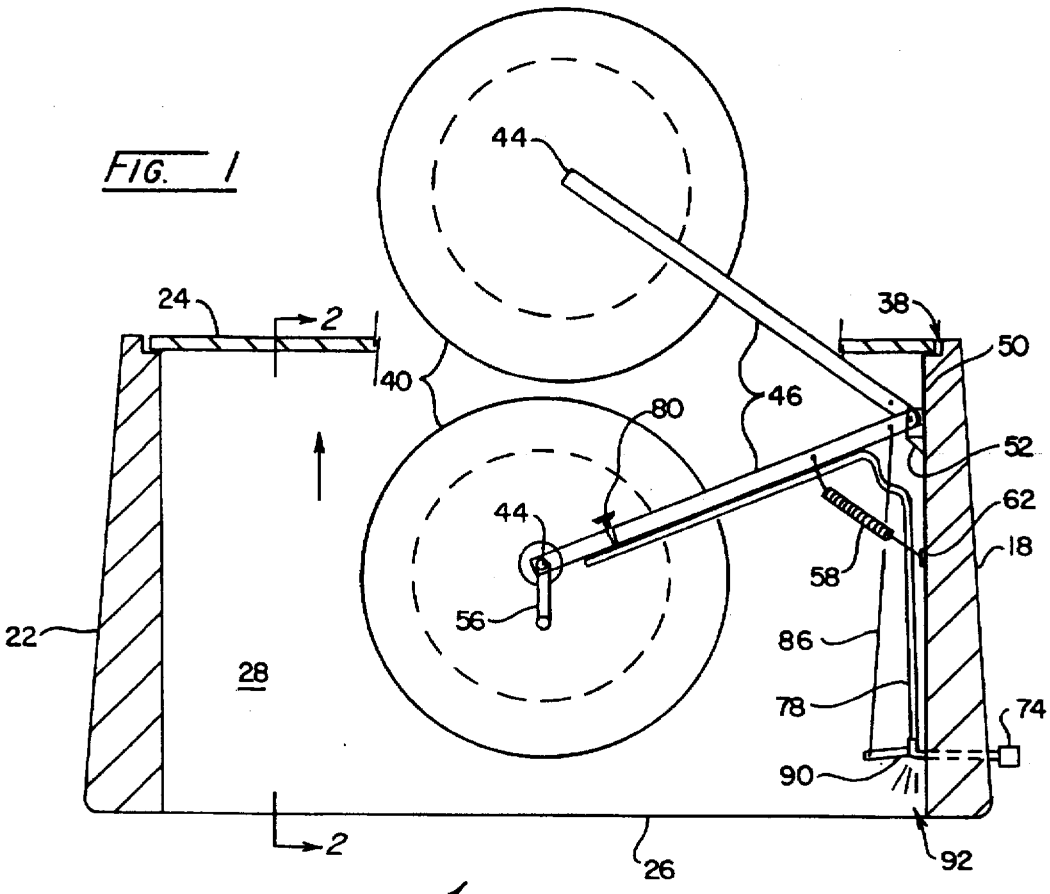
FIG. 1 is a sectional view of the combination of a box enclosure and a mounted hose reel according to this invention.

As an alternative, see FIG. 1, an automatic shut-off can be incorporated into the box 10 by providing a rod 86 connected to support arm 46 and to valve lever arm 88. Thereby, when support arm 46 rises, it automatically turns on valve 90 secured on the inner end of stub 74. Similarly, when support arm 46 is pushed into the enclosure 28 the rod 86 closes valve 90. A similar pressure relief valve 92 serves the same function as pressure relief valve 82.

Having thus described the invention in its preferred embodiment, it will be clear that various modifications may be made to the invention without departing from the spirit of the invention as disclosed herein. It is not intended that the language used in describing the inventive concept nor the drawings illustrating the same be limiting on the invention. Rather it is intended that the invention be limited only by the scope of the appended claims.

I claim:

1. A hose and reel mounting system comprising, a box having a plurality of sidewalls and a top, said top being pivotally mounted on one of said sidewalls to form an enclosure with an open bottom, a lever rigidly connected to said top projecting from said top near said pivotal mounting and extending transversely of said one sidewall in a direction away from said enclosure, at least one lug on another of said sidewalls and projecting into said enclosure, a pair of arms pivotally connected to said lug, said arms supporting the ends of a reel, said reel having a hose wound thereon said arms serving to pivot said reel from within said enclosure to a location above said enclosure, a compression spring secured to said one sidewall and one of said arms to provide an upward bias to said one arm, a water feed line connected to both said hose and to a source of water, a valve in said feed line to control the flow of water from said source to said hose, and a releasable latch to hold said reel within said enclosure against the bias of said spring.

2. The system of claim 1 including a pressure relief valve intermediate said hose and said control valve to relieve pressure in said hose when said control valve is closed.

3. The system of claim 2 wherein said sidewalls taper in thickness from their upper edges to greater thickness in a downward direction.

4. The system of claim 2 wherein said water feed line extends through an aperture in a sidewall.

5. The system of claim 2 wherein said box is recessed in a surrounding structure, said structure having an upper surface, said upper surface being at about the same elevation as said top.

6. The system of claim 3 wherein said sidewalls taper in thickness from their upper edges to greater thickness in a downward direction.

7. The system of claim 3 wherein said water feed line extends through an aperture in a sidewall.

8. The system of claim 5 wherein said surrounding structure includes a hole to accommodate the pivoting of said lever when said top is opened.

9. The system of claim 8 wherein said sidewalls taper in thickness from their upper edges to greater thickness in a downward direction.

10. The system of claim 9 wherein said water feed line extends through an aperture in a sidewall.

11. The system of claim 10 wherein said control valve is secured to one of said arms.

12. The system of claim 10 where in said control valve is mounted in said feed line adjacent said aperture in said sidewall.

13. The system of claim 1 wherein said box is recessed in a surrounding structure, said structure having an upper surface, said upper surface being at about the same elevation as said top.

14. The system of claim 13 wherein said surrounding structure includes a hole to accommodate the pivoting of said lever when said top is opened.

15. The system of claim 14 wherein said sidewalls taper in thickness from their upper edges to greater thickness in a downward direction.

16. The system of claim 15 wherein said water feed line extends through an aperture in a sidewall.

17. The system of claim 16 wherein said control valve is secured to one of said arms.

18. The system of claim 16 where in said control valve is mounted in said feed line adjacent said aperture in said sidewall.

19. The system of claim 1 wherein said sidewalls taper in thickness from their upper edges to greater thickness in a downward direction.

20. The system of claim 1 wherein said water feed line extends through an aperture in a sidewall.

* * * * *